United States Patent [19]

Sazaki et al.

[11] 4,389,027
[45] Jun. 21, 1983

[54] BAIL ARM REVERSING DEVICE FISHING SPINNING REELS

[75] Inventors: Kounin Sazaki; Takehiro Kobayashi, both of Fukuyama, Japan

[73] Assignee: Ryobi Limited, Fuchu, Japan

[21] Appl. No.: 344,928

[22] Filed: Feb. 2, 1982

[30] Foreign Application Priority Data

Feb. 11, 1981 [JP] Japan .............................. 56-18370[U]

[51] Int. Cl.³ .............................................. A01K 89/01
[52] U.S. Cl. ......................... 242/84.2 G; 242/84.21 R
[58] Field of Search .................... 242/84.2 G, 84.2 A, 242/84.2 R, 84.21 R, 84.21 A

[56] References Cited

U.S. PATENT DOCUMENTS 2,966,314 12/1960 Mombur ...................... 242/84.21 R
3,342,442 9/1967 Brantingson ................... 242/84.2 G

FOREIGN PATENT DOCUMENTS 2852934 12/1978 Fed. Rep. of Germany ..... 242/84.2 G
994094 8/1951 France ......................... 242/84.2 G Primary Examiner—Billy S. Taylor

[57] ABSTRACT

A bail arm reversing device comprises a rotor provided with a pair of diametrically opposing arms, a bail arm with both ends rotatably supported by the pair of arms in eccentric relation with respect to an axis of the rotor, a torsion spring for selectively biasing the bail arm toward a string take up position and a string pay out position, a first timing gear having one end pivotally connected to a spoke of the rotor, a second timing gear mounted on one of the pair of arms and a hand operated lever provided with a second kick gear. The bail arm and the hand operated lever are interconnected by a link mechanism having a dead center. A ratchet wheel is provided to cooperate with a pawl mounted on the first timing gear whereby the bail arm can snap to a string pay out position or a string take up position when the link mechanism passes the dead point.

8 Claims, 7 Drawing Figures

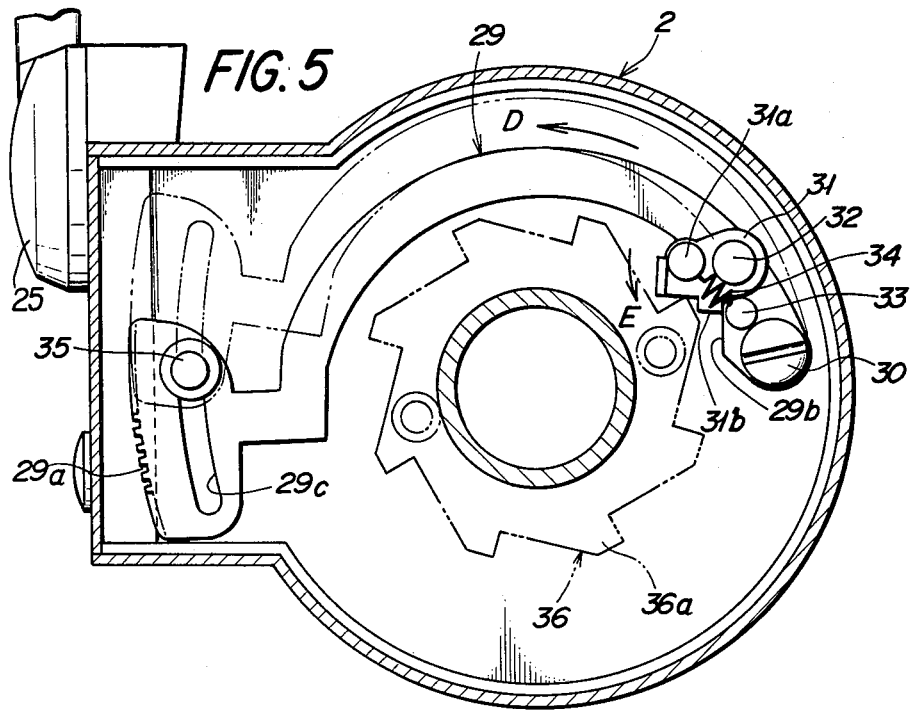
FIG. 5
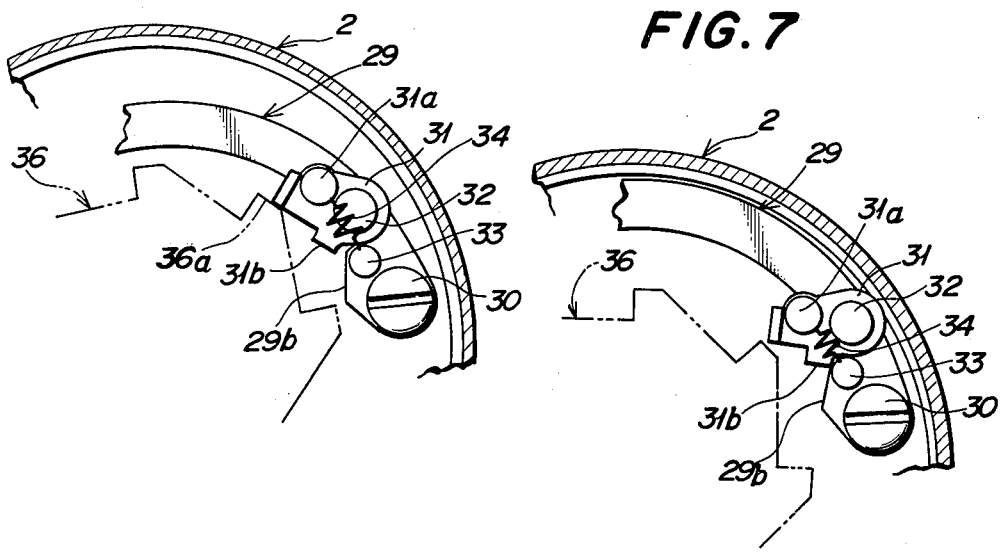
FIG. 6
FIG. 7

BAIL ARM REVERSING DEVICE FISHING SPINNING REELS

BACKGROUND OF THE INVENTION

This invention relates to a bail arm reversing device of a fishing reel, more particularly an auter spool type fishing spinning reel.

A prior art bail arm reversing device is constructed such that the bail arm is manually operated from a string take up position to an upright string pay out position, and that after the string has been paid out the handle is rotated in the forward direction to automatically return the bail arm from the string pay out position to the string take up position.

However, in the prior art construction, for the purpose of rotating the bail arm from the string pay out position to the string take up position, it is necessary to rotate the rotor substantially one revolution so that the reversing operation of the bail arm is slow. Moreover, since there is at least one dead point for the rotation of the bail arm from the string take up position to the upright string pay out position it has been difficult to quickly move the bail arm between the string take up and pay out positions.

SUMMARY OF THE INVENTION

It is, therefore, an object of this invention to provide an improved bail arm reversing device of a spinning reel that can rapidly move the bail arm between the string pay out position and the string take up position.

Another object of this invention is to provide a novel bail arm reversing device in which component elements thereof are completely covered so as not to catch the string.

According to this position there is provided a bail arm reversing device of an outer spool type spinning reel comprising a main body of a reel, a rotor supported by the main body and provided a pair of arms formed on a periphery of the rotor at diametrically opposing positions, a bail arm having opposite ends rotatably supported by the pair of arms, the bail arm being eccentrically mounted with respect to an axis of rotation of the rotor, a torsion spring for selectively biasing the bail arm toward a string take up position and a string pay out position, a first timing gear having one end pivotally connected to a spoke of the rotor to be movable in a radial direction, a second timing gear mounted on one arm, a hand operated lever mounted on the one arm and provided with a second kick gear, a link mechanism interconnecting the bail arm with the hand operated lever, the link mechanism having a dead point which determines the direction of movement of the bail arm, a pawl mounted on the first timing gear, a first kick gear having a plurality of teeth and secured to the rotor, spring means for urging the pawl to engage the teeth of the first kick gear whereby the bail arm snaps to a string pay out position or a string take up position when the link mechanism passes the dead point.

BRIEF DESCRIPTION OF THE DRAWINGS

In the accompanying drawings:

FIG. 5 is a sectional view taken along a line V—V shown in FIG. 4;

FIGS. 6 and 7 show a relation between a first timing gear and a first kick gear in which FIG. 6 shows a string pay out state and FIG. 7 a string take up state.

DESCRIPTION OF THE PREFERRED EMBODIMENT

Figure 1:
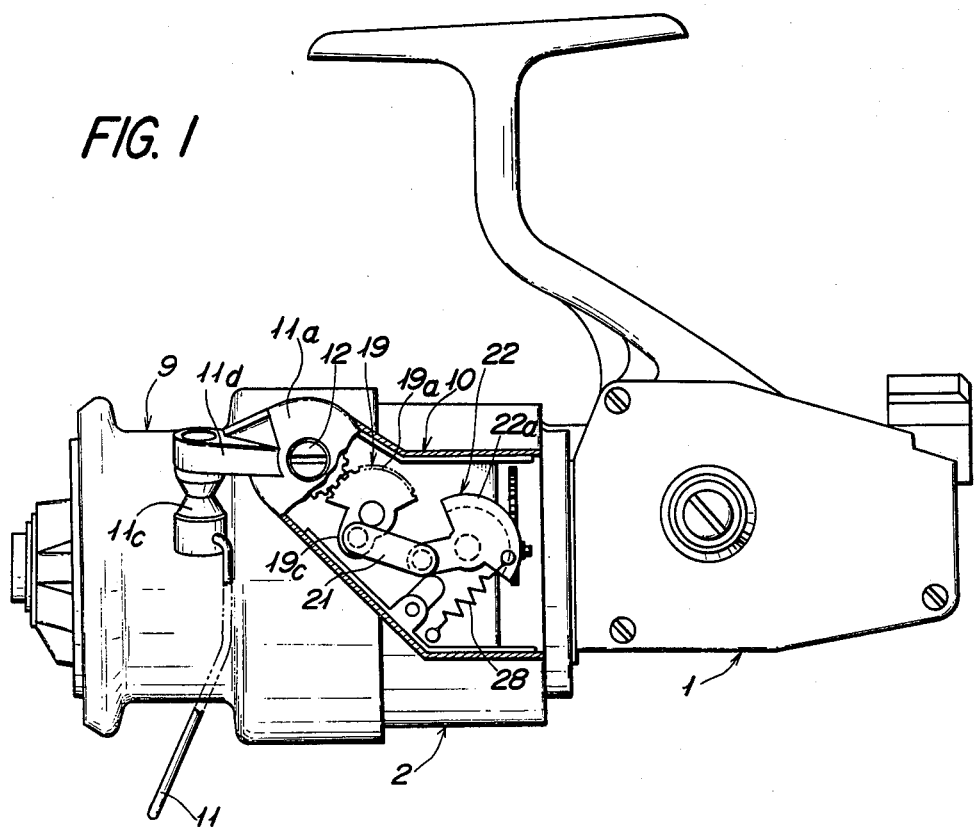
FIG. 1 is a side view showing an outer spool type spinning reel incorporated with a bail arm reversing device embodying the invention.
Figure 2:
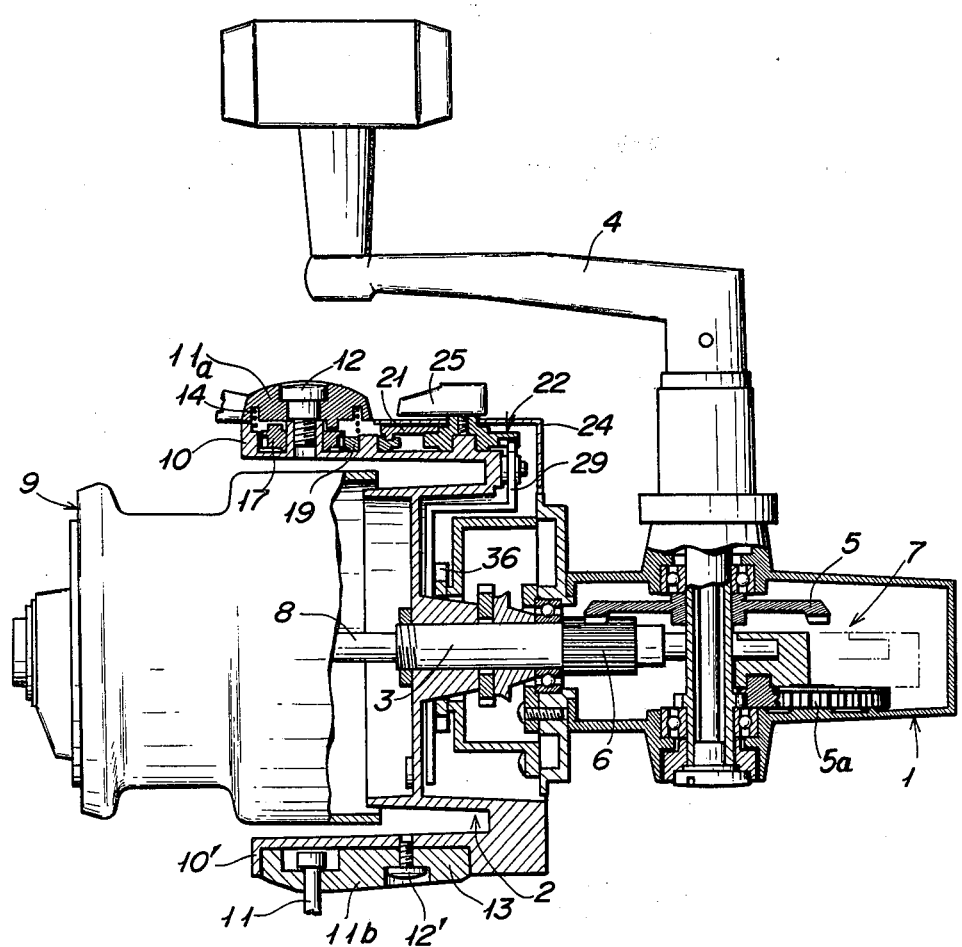
FIG. 2 is a side view, partly in section of the spinning reel shown in FIG. 1.

As shown in FIGS. 1 and 2, a rotor 2 is rotatably supported by the main body of a reel 1 through a tubular shaft 3. The rotor 2 is rotated by a handle 4 through a gear 5 and pinion 6 formed on the shaft 3.

The handle 4 also drives a reciprocating mechanism 7 through an oscillatable gear 5a for reciprocating a spool 9 mounted on a shaft 8 extending through the tubular shaft 3 and surrounding the rotor 2 for uniformly taking up a fishing string about the spool 9 via a bail arm 11 with both ends pivotally supported by arms 10 and 10' secured to the rotor 2 at diametrically opposite positions.

The bail arm 11 is provided with a string guide roller 11c, a bail lever 11a and a bail arm cam 11b which are rotatably mounted on the arms 10 and 10' by screws 12 and 12'.

The bail arm reversing device is constructed as follows. More particularly, a string guide roller supporting portion 11d is located eccentrically with respect to the axis of rotation of the rotor 2 in order to reduce the swinging angle of the string guide roller 11c and the base of the bail arm 11 is pivotally mounted on the portion 11d, while the other arm 10' is attached with a balance weight 13. It is advantageous that the degree of eccentricity of the bail arm 11 should be larger than ⅓ of the radius of the spool.

As shown in FIG. 2, a torsion spring 14 is interposed between the bail arm lever 11a and the arm 10. One end of the torsion spring 14 is secured to an opening 15 of the arm 10, while the other end to an opening 16 of the bail arm lever 11a, with the condition to force the torsional force of the spring 14 acting in a direction A shown in FIG. 3 so as to rotate the opening 16 to the position 16', thus biasing the bail arm 11 from a neutral position to the string pay out position shown by solid lines in FIG. 3 or to the string take up position shown by dot and dash lines.

A gear 17 rotatably mounted on a boss 18 is disposed between the bail arm lever 11a and the arm 10. The gear 17 is formed with a projection 17a which engages a projection 11a formed on the bottom of the bail arm lever 11a to rotate the same.

The gear 17 meshes with a second timing gear 19 having a sector gear 19a, a central opening 19b and a lever 19c. The second timing gear 19 is rotatably mounted on a vertical shaft 20 integral with the arm 10 and the lever 19c is pivotally connected to one end of a link 21 with the other end pivotally connected to a lever 22c of a second kick gear 22 having a sector gear 22a and a central opening 22b in addition to the lever 22c. The second kick gear 22 is mounted on a vertical projection 23 of the arm 10. The second kick gear 22 is provided with an upwardly projecting integral boss 22d which projects upwardly through a cover 24 of the arm 24 and a hand operated lever 25 secured to the upper end of the boss 22d by a set screw 26 so as to rotate the second kick gear 22 by the hand operated lever 25. A tension spring 28 is connected between pins 22e and 27 provided for the second kick gear 22 and the arm 10 respectively for biasing the second kick gear in the clockwise direction as viewed in FIG. 3.

Figure 3:
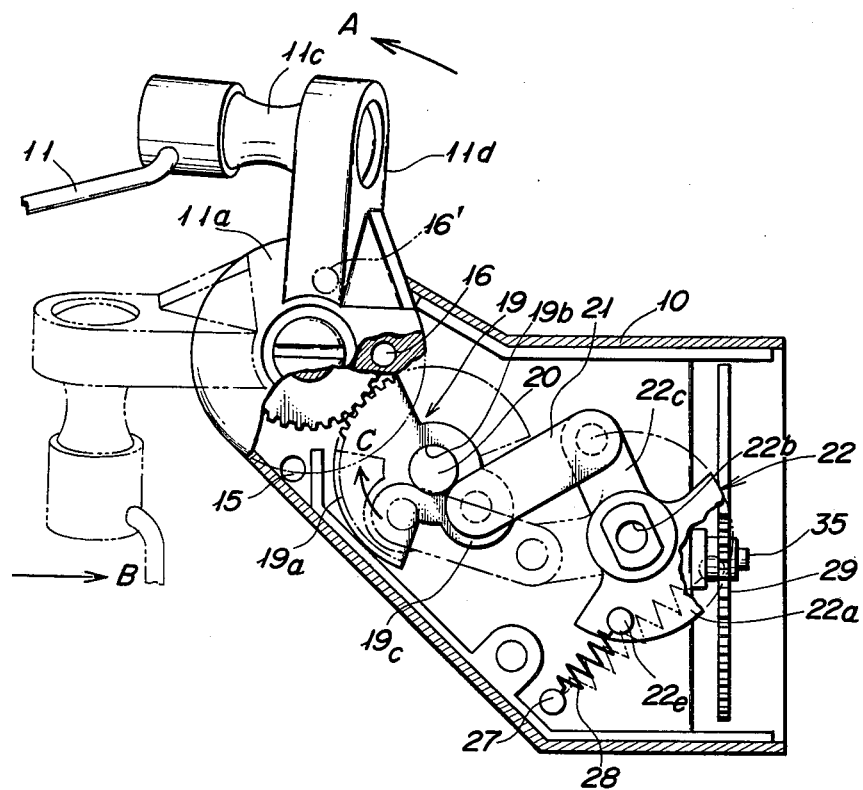
FIG. 3 is an enlarged plan view of the bail arm reversing device.
Figure 4:
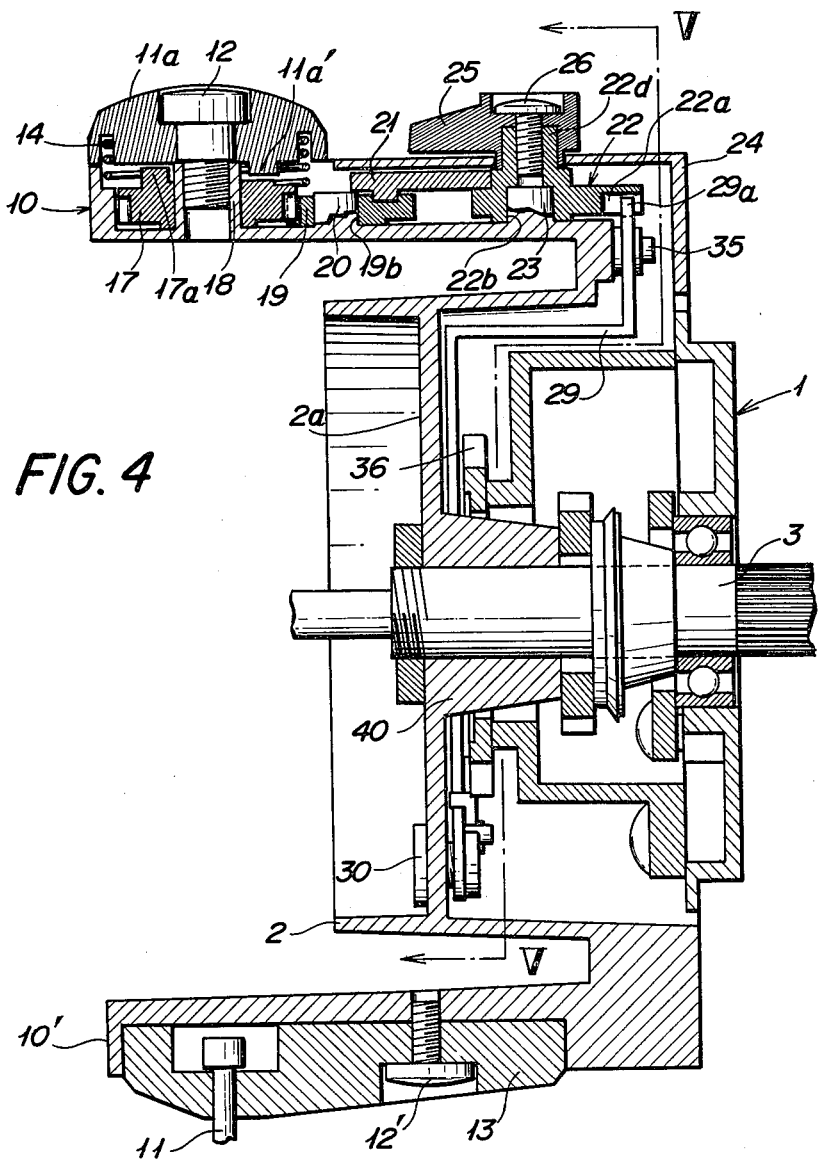
FIG. 4 is an enlarged longitudinal sectional view of the bail arm reversing device.

The second timing gear 19, the link 21 and the second kick gear 22 constitute a link mechanism having a dead point. When the bail arm 11 at a position shown by dot and dash lines in FIG. 3 is pressed in a direction shown by an arrow B to rotate the second timing gear 19 in a direction shown by an arrow C, the link mechanism reaches the dead point. When the bail arm 11 is released, due to the force of the spring 28 and the force of a torsion spring 14 surrounding the bail arm lever 11a and acting in a direction shown by an arrow A the bail arm 11 snaps to the upright string pay out position beyond the dead point.

One end of an arcuate first timing gear 29 bent in a form of Z is pivotally connected to a spoke 2a of the rotor 2 by means of a screw 30, the spoke 2a extending perpendicularly to the arm 10. Teeth 29a are formed on the periphery of the first timing gear 29 which mesh with the second kick gear 22 at right angles, and a kick pawl 31 is pivotally mounted on a pin 32 near the screw 30, as shown in FIG. 5. The pawl 31 is biased to rotate in the counterclockwise direction E as viewed in FIG. 5 by a spring 34 with both ends secured to a pin 31a on the pawl 31 and a pin 33 on the first timing gear 29 so as to cause the projection 31b of the pawl 31 to engage against the inner end surface 29b of the first timing gear 29. The timing gear 29 is provided with an arcuate slot 29c and a screw 35 passing through the slot 29c is threaded into the rotor 2 so as to permit the timing gear 29 to move in the peripheral direction of the rotor 2.

A first kick gear in the form of a ratchet wheel 36 provided with a plurality of teeth 36a engageable with the pawl 31 is secured to the boss 40 of the rotor 2 so as to interlock the pawl 31, bail arm 11 and the bail arm lever 11a. Thus, as the string pay out position of the bail arm 11, the pawl disengages from the ratchet wheel, whereas at the string take up position the pawl engages the ratchet wheel.

The bail arm reversing device described above operates as follows. When the bail arm 11 is pressed with a hand in the direction of B, FIG. 3, while the bail arm 11 is maintained at the string take up position shown by the dot and dash lines in FIG. 3, the second timing gear 19 is rotated in the direction of C through the bail arm lever 11a and the gear 17, whereby the link mechanism constituted by the lever 19c, the link 21 and the second kick gear 22 reaches the dead point.

Then, when the bail arm 11 is released, the link mechanism is caused to pass the dead point by the forces of the spring 28 and the torsion spring 14 so as to rotate the bail arm 11 to the string pay out position shown by solid lines in FIG. 3. At this time, the first timing gear 29 rotates about the screw 30 toward the axis of the rotor 2 so that even when the ratchet wheel 36 that is the first kick gear 36 is at a position shown in FIG. 6, the spring 34 can expand to rotate the pawl 31 in the clockwise direction to bring the bail arm 11 to the string pay out position. When the ratchet wheel 36 is in a position shown in FIG. 5 with its one tooth engaged with the pawl 31, the bail arm 11 is brought to the string pay out position.

To change the position of the bail arm 11 from the string pay out position to the string take up position, the handle 4 is rotated in the forward direction to rotate the rotor 2 in the counterclockwise direction D as viewed in FIG. 5 so that the pawl 31 in engagement with the first kick gear 36 that is the ratchet wheel would be rotated in the counterclockwise direction E. Then, the projection 31b of the pawl comes to engage with the inner end surface 29b of the first timing gear 29 to rotate the same in the outward direction to move away from the axis of the rotor 2 until the link mechanisms passes the dead point. At this time, the first timing gear 29 is caused to disengage from the first kick gear 36 by the force of the torsion spring 14 to assume a state shown in FIG. 7, whereby the bail arm 11 is returned to the string take up position shown by dot and dash lines in FIG. 3.

As above described, according to the bail arm reversing device of a spinning reel embodying the invention, at the string pay out position of the bail arm 11, the kick pawl 31 pivotally mounted on the first timing gear 29 is rotated outwardly against the force of the torsion spring 34 so as to engage the teeth of the first timing gear 29 in the form of a ratchet wheel. Moreover, as there is no dead point as in the prior art construction, the bail arm 11 can readily and quickly changed from the string take up position to the string pay out position at any point between these two positions by merely pressing the bail arm. Moreover, as the center of rotation of the bail arm 11 is displaced (or made to be eccentric) from the center of rotation of the rotor 2 the change of the position can be rapidly made by slightly rotating the handle 4. Since the change of the bail arm 11 from the string pay out position to the string take up position can be made either by handle 4 and the hand lever 25, the bail arm can be reversed very quickly. Moreover, as the component parts for effecting the reversal of the bail arm are contained in the arm 10 and not exposed to outside, there is no fear of arresting the string.

What is claimed is:

1. A bail arm reversing device of an outer spool type spinning reel comprising:
 a main body of a reel;
 a rotor supported by said main body and provided with a pair of arms formed on a periphery of said rotor at diametrically opposing positions;
 a bail arm having opposite ends rotatably supported by said pair of arms, said bail arm being eccentrically mounted with respect to an axis of rotation of said rotor,
 a tension spring for selectively biasing said bail arm toward a string take up position and a string pay out position;
 a first timing gear having one end pivotally connected to a spoke of said rotor to be movable in a radial direction;
 a second timing gear mounted on one of said pair of arms;
 a hand operated lever mounted on said one arm and provided with a second kick gear;
 a link mechanism interconnecting said bail arm with said hand operated lever, said link mechanism having a dead point which determines the direction of movement of said bail arm;
 a pawl mounted on said first timing gear;
 a first kick gear having a plurality of teeth and secured to said rotor;
 spring means for urging said pawl to engage said teeth of said first kick gear whereby said bail arm snaps to a string pay out position or a string take up position when said link mechanism passes said dead point.

2. The bail reversing device according to claim 1 which further comprises a spool for wrapping a fishing string and a handle for rotating said rotor and for reciprocating said spool in an axial direction of said rotor through gears.

3. The bail arm reversing device according to claim 1 wherein said link mechanism comprises a first sector gear meshing with said second timing gear for rotating said bail arm and a second sector gear and a link for interconnecting said first and second sector gears.

4. The bail arm reversing mechanism according to claim 1 wherein said kick gear comprises a ratchet wheel.

5. The bail arm reversing mechanism according to claim 1 wherein said first timing gear is provided with an arcuate slot and wherein a screw is threaded into said rotor through said arcuate slot so that said first timing gear can move in a peripheral direction of said rotor.

6. The bail arm reversing device according to claim 3 wherein said first timing gear takes the form of a letter Z and is provided with teeth about a periphery thereof which mesh with said second sector gear.

7. The bail arm reversing device according to claim 1 wherein said reversing device is covered by a cover provided for main body.

8. The bail arm reversing device according to claim 1 wherein the other of said pair of arms is provided with a balancing weight.

* * * * *